(12) United States Patent
Wu

(10) Patent No.: US 11,706,805 B2
(45) Date of Patent: Jul. 18, 2023

(54) ENHANCED LISTEN-BEFORE-TALK

(71) Applicant: GOOGLE LLC, Mountain View, CA (US)

(72) Inventor: Chih-Hsiang Wu, Taoyuan (TW)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 17/736,340

(22) Filed: May 4, 2022

(65) Prior Publication Data

US 2022/0264648 A1   Aug. 18, 2022

Related U.S. Application Data

(63) Continuation of application No. 17/432,911, filed as application No. PCT/US2020/019397 on Feb. 23, 2020.

(Continued)

(51) Int. Cl.
*H04W 74/08* (2009.01)
*H04W 72/1263* (2023.01)
(Continued)

(52) U.S. Cl.
CPC ... *H04W 74/0816* (2013.01); *H04W 72/1263* (2013.01); *H04W 72/56* (2023.01);
(Continued)

(58) Field of Classification Search
CPC . H04W 74/0816; H04W 74/08; H04W 74/02; H04W 74/0841; H04W 74/085;
(Continued)

(56) References Cited

U.S. PATENT DOCUMENTS

2016/0302100 A1\* 10/2016 Kanamarlapudi ..........................
                                                  H04W 72/1242
2017/0238342 A1\* 8/2017 Yang ..................... H04W 74/04
                                                  370/329
(Continued)

FOREIGN PATENT DOCUMENTS

WO    WO-2020/032628 A1   2/2020
WO    WO-2020/068616 A1   4/2020

OTHER PUBLICATIONS

International Search Report and Written Opinion for Application No. PCT/US2020/019397, dated May 20, 2020.

(Continued)

*Primary Examiner* — Redentor Pasia
(74) *Attorney, Agent, or Firm* — Marshall, Gerstein & Borun LLP

(57) ABSTRACT

An enhanced LBT procedure (200) mitigates unnecessary delays in delivering transmissions between User Equipment and base stations over unlicensed spectrum. A UE or base station selects a particular CAPC corresponding to an intended transmission (225) based on an intelligent mapping of different types of transmission payload (e.g., transmission payload other than or in in addition to pre-defined, QoS-related UP message data payload) to different CAPCs. Most (if not all) of the mapped CAPCs corresponding to the different types of transmission payload are of a higher priority than a lowest priority CAPC (212-222), resulting in channel access procedures that are more commensurate with respective transmission payloads. The intelligent mapping may indicate different priorities among different types of transmission payload and/or different types of messages, and/or may indicate which type of transmission is to govern selection of a CAPC when multiple types of transmission payload are included in a single, intended transmission.

13 Claims, 4 Drawing Sheets

Related U.S. Application Data

(60) Provisional application No. 62/810,200, filed on Feb. 25, 2019, provisional application No. 62/809,600, filed on Feb. 23, 2019.

(51) Int. Cl.
  H04W 74/00 (2009.01)
  H04W 72/56 (2023.01)
  H04W 72/566 (2023.01)

(52) U.S. Cl.
  CPC ....... H04W 72/569 (2023.01); H04W 74/002 (2013.01); H04W 74/0808 (2013.01); H04W 74/0833 (2013.01)

(58) Field of Classification Search
  CPC ......... H04W 74/0866; H04W 74/0875; H04W 72/1242; H04W 72/1263; H04W 72/1268; H04W 74/002; H04W 74/004; H04W 74/006
  See application file for complete search history.

(56) References Cited

U.S. PATENT DOCUMENTS

| | | | |
|---|---|---|---|
| 2017/0257852 A1* | 9/2017 | Wu | H04L 1/1854 |
| 2017/0353972 A1* | 12/2017 | Babaei | H04W 72/02 |
| 2018/0007716 A1* | 1/2018 | Wu | H04W 74/004 |
| 2019/0053273 A1* | 2/2019 | Kim | H04W 74/02 |
| 2020/0015236 A1* | 1/2020 | Kung | H04B 7/04 |
| 2020/0100285 A1* | 3/2020 | Roy | H04W 74/0808 |
| 2020/0112971 A1* | 4/2020 | Kunt | H04W 72/23 |
| 2020/0186304 A1* | 6/2020 | Khoshnevisan | H04W 52/365 |
| 2020/0267761 A1* | 8/2020 | Lee | H04W 74/0808 |
| 2020/0275484 A1* | 8/2020 | Xu | H04W 72/14 |
| 2020/0314895 A1* | 10/2020 | Bergström | H04W 28/0268 |
| 2021/0235512 A1* | 7/2021 | Lee | H04W 48/16 |
| 2021/0289548 A1* | 9/2021 | Murray | H04W 72/23 |
| 2022/0132573 A1* | 4/2022 | Roy | H04W 72/14 |

OTHER PUBLICATIONS

Huawei et al., "Consideration on Channel Access Priority Class," 3GPP (2018).
Mediatek Inc., "LBT and CAPC for Random Acces in NR-U," 3GPP (2018).
LG Electronics Inc., "Access Priority for Transmissions over Control Plane in NR-U," 3GPP (2019).
Charter Communications, "LBT for Control Transmissions Without Multiplexed Data," 3GPP (2019).
"3rd Generation Partnership Project; Technical Specification Group Radio Access Network; Study on NR-Based Access to Unlicensed Spectrum," 3GPP (2018).
First Examination Report for India Application No. 202147042492, dated Mar. 30, 2022.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 (2018).
Office Action for European Application No. 20713129.3, dated Jun. 30, 2022.
ZTE, "Discussion on Enhancement of Initial Access Procedures for NR-U," 3GPP Draft (Jan. 2019).

* cited by examiner

ENHANCED LISTEN-BEFORE-TALK

CROSS-REFERENCE TO RELATED APPLICATIONS

This patent application is a continuation application of U.S. application Ser. No. 17/432,911, filed Aug. 21, 2021, which is a national stage application, filed under 35 U.S.C. § 371, of International Application No. PCT/US2020/019397, filed Feb. 23, 2020 and entitled "Enhanced Listen-Before-Talk," which claims priority to and the benefit of U.S. Provisional Patent Application No. 62/809,600, filed Feb. 23, 2019 and entitled "Enhanced Listen-Before-Talk," and which also claims priority to U.S. Provisional Patent Application No. 62/810,200, filed Feb. 25, 2019 and entitled "Enhanced Listen-Before-Talk," the disclosures of which are incorporated by reference herein in their entireties.

FIELD OF THE DISCLOSURE

This disclosure relates to wireless communications and, more particularly, to allocating resources for wireless communications in an unlicensed portion of the spectrum.

BACKGROUND

The background description provided within this document is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In some cases, base stations and user devices operating in wireless communication network systems can utilize portions of both licensed and unlicensed radio spectrum. 5G New Radio (NR), for example, supports operations in the unlicensed spectrum, commonly referred to as NR-U. One of the requirements of NR-U is co-existence with other radio access technology such as WiFi® (IEEE 802.11).

Because base stations and User Equipment devices (UEs) cannot rely on persistent scheduling of time-frequency resources in the unlicensed spectrum, base stations and UEs implement a channel access procedure to determine whether a certain channel is idle, prior to transmitting. The channel access procedure can be, for example, the so-called listen-before-talk (LBT) procedure, which generally is a mechanism by which a device (e.g., a base station or a UE) applies a clear channel assessment (CCA) check before using the channel. The CCA in turn utilizes the least-energy detection to determine the presence or absence of other signals on a channel in order to determine whether the channel is occupied or clear (idle).

While operating in unlicensed spectrum, and prior to transmitting, a device of a wireless network system performs an LBT procedure in accordance with an associated channel access priority class (CAPC). Channel access priority classes range in priority from a highest priority (e.g., CAPC 1) to a lowest priority (e.g., CAPC 4), and channel access priority classes govern the maximums, minimums, and allowed sizes of contention windows, the maximum link occupancy time, number of consecutive durations for deferral (which may be indicated in units of milliseconds and/or may be indicated in units of slots whose durations are based on subcarrier spacing used for communication between a UE and a base station), and other time-based parameters that are followed by devices while performing channel access procedures such as LBT. For example, a higher channel access priority class may correspond to smaller or shorter contention windows, occupancy times, number of deferral time slots, etc., while a lower channel access priority class may correspond to larger or longer contention windows, occupancy times, number of deferral time slots, etc. As such, a device that performs an LBT procedure in accordance with a higher CAPC may be able to deliver its intended transmission sooner, and with less delay, than a device that performs an LBT procedure in accordance with a lower CAPC.

In an illustrative example, 3GPP TR 38.889 v16.0.0 specifies in Table 7.2.1.3.1-4: "Channel access schemes for initiating a COT by UE as LBE device" (a copy of which is reproduced below) that a UE which intends to transmit a User Plane (UP) message via a PUSCH (Physical Uplink Shared Channel) shall perform an LBT in accordance with a CPAC that corresponds to the type of UP data payload that is included in the UP message.

TABLE 7.2.1.3.1-4

Channel access schemes for initiating a COT by UE as LBE device

| | Cat 2 LBT | Cat 4 LBT |
|---|---|---|
| PUSCH (including at least UL-SCH with user plane data) | N/A except for the cases discussed in Note 2 below | Channel access priority class is selected according to the data |
| SRS-only | N/A | Cat4 with lowest channel access priority class value (as in LTE eLAA) |
| RACH-only | (see Note 2) | Cat4 with lowest channel access priority class value |
| PUCCH-only | (see Note 2) | Cat4 with lowest channel access priority class value |

Generally speaking, different types of user plane payload may correspond to different Quality of Service (QoS) Class Identifiers (QCIs), and different QCIs correspond to different CAPCs. For example, 3GPP TS 36.300 v15.4.0 specifies in Table 5.7.1-1: "Mapping between Channel Access Priority Classes and QCI" (a copy of which is reproduced below) that QCIs 1, 3, 5, 65, 66, 69, and 70 correspond to CAPC 1, QCIs 2 and 7 correspond to CAPC 2, QCIs 4, 6, 8, and 9 correspond to CAPC 3, and other QCIs correspond to CAPC 4.

TABLE 5.7.1-1

Mapping between Channel Access Priority Classes and QCI

| Channel Access Priority Class | QCI |
|---|---|
| 1 | 1, 3, 5, 65, 66, 69, 70 |
| 2 | 2, 7 |
| 3 | 4, 6, 8, 9 |
| 4 | — |

Thus, for an example message that includes a type of UP payload having a QCI of 3, the UE performs an LBT in accordance with CAPC 1 prior to transmission of the UP message, and for an example message that includes a type of UP payload having a QCI of 8, the UE performs an LBT in accordance with CAPC 3 prior to the transmission of the UP message. The UE transmits the intended messages upon successful completions of respective LBT procedures.

Table 7.2.1.3.1-4 of 3GPP TR 38.889 v16.0.0 also indicates that a UE which intends to transmit only an SRS (Sounding Reference Signal), only a RACH (Random Access Procedure) message, or only control information via a PUCCH (Physical Uplink Control Channel) shall perform an LBT in accordance with a lowest priority CAPC. However, this approach of defaulting to a lowest priority CAPC for messages that do not include UP data payload corresponding to a QoS or QCI suffers from unnecessary, inconsistent, and incompatible delays of uplink transmissions from the UE to the base station. For example, by using this approach, during a two-step RACH procedure, the transmission of a msgA that includes a User Plane (UP) message or a Control Plane (CP) message that is associated with a higher channel access priority class is nonetheless subject to the delays of an LBT procedure performed in accordance with the lowest priority CAPC and its accompanying lengthier control windows, occupancy times, etc. In another example, during a four-step RACH procedure, the transmission of a msg3 including UP content payload that is associated with a higher channel access priority class nonetheless suffers from the delays of a previous LBT procedure performed in accordance with the lowest priority CAPC prior to the transmission of the msg1 of the four-step RACH procedure. Similarly, UE transmissions that include control-plane (CP) messages or information are subject to unnecessary, inconsistent, or even unknown delays due to LBT procedures that are performed based on a lowest priority CAPC.

Further, a wireless network system may also suffer from unnecessary, inconsistent, and incompatible delays of downlink transmissions from the base station to the UE, as such downlink transmissions are also subject to delays introduced by LBT procedures that are performed in accordance with a lowest priority CAPC prior to delivering the downlink transmissions. Essentially, these approaches, whether uplink or downlink, may result in an unfavorable mismatch between a Channel Access Priority Class and a priority of a payload of the intended transmission, which leads to inappropriate, inconsistent, and unnecessary delays in delivering the intended transmission itself.

SUMMARY

The methods, systems, devices, and techniques described in this disclosure perform Listen-Before-Talk (LBT) procedures, prior to delivering an intended transmission over unlicensed spectrum, in accordance with channel access priority classes (CAPCs) that intelligently correspond to different types of payload of intended transmissions other than or in addition to User Plane (UP) message data payloads that have pre-defined, respective QCIs or that otherwise correspond, a priori, to respective QoS levels. A device (e.g., a base station or a UE) selects a particular CAPC corresponding to an intended transmission based on a mapping of different types of transmission payload (e.g., transmission payload other than or in in addition to pre-defined, QoS-related UP message data payload) to different CAPCs. Advantageously, the mapped CAPCs are commensurate with the respective priorities of the different types of transmission payload and, in some situations, with respect to other types of transmission payload and/or with respect to the particular procedure being executed by the UE and base station. Most (if not all) of the mapped CAPCs corresponding to the different types of transmission payload are of a higher priority than a lowest priority CAPC, and thus result in channel access procedures that are more commensurate with respective transmission payloads. The mapping may also reflect different priorities among different types of transmission payload, if desired, and/or may indicate which type of transmission is to govern selection of a CAPC when multiple types of transmission payload are included in an intended transmission. As such, the methods, systems, devices, and techniques described in this disclosure mitigate the unnecessary, inconsistent, and incompatible delays of delivering intended transmissions between UEs and base stations within a wireless network system.

In an example embodiment, a method in a device of a wireless network system includes initiating, by processing hardware of the device, a procedure to deliver a transmission via a wireless channel. The device may be a UE or a base station, for example, and the transmission is an intended transmission which may include, for example, a Control Plane (CP) message, a User Plane (UP) message, a RApreamble or other type of signal that is locally exchanged between the UE and base station, etc. The wireless channel may be, for example, a PUCCH (Physical Uplink Control Channel), PUSCH (Physical Uplink Shared Channel), PDCCH (Physical Downlink Control Channel), PDSCH (Physical Downlink Shared Channel), or some other uplink or downlink wireless channel that is utilized by a UE and one or more base stations of a wireless network system to communicate with each other and/or to deliver data payload. The wireless channel may be implemented in unlicensed spectrum, and is so described within this document. However, it is understood that the techniques described within this document may be easily applied to any wireless spectrum, licensed or unlicensed, in which contention for channels or carriers may occur.

Additionally, the method includes a selecting, by the processing hardware of the device, a channel access priority class (CAPC) from a plurality of CAPCs of different channel access priority classes, where the selected CAPC has a channel access priority higher than a channel access priority of another CAPC included in the plurality of CAPCs. In an example, the selected CAPC has a channel access priority higher than a lowest channel access priority of the plurality of CAPCs. The device selects the CAPC based on a type of payload of the transmission and a mapping. Types of transmission payload based on which the device selects the CAPC may include, for example, Control Plane (CP) messages, different types of CP messages, User Plane (UP) messages, different types of UP messages, different types of data payload of UP messages, Random Access preambles, other types of localized signaling between the UE and base station, and other types of transmission payload.

The mapping indicates respective associations between respective CAPCs of the plurality of CAPCs and one or more different types of transmission payload. In an example, the mapping indicates respective associations between respective CAPCs and one or more types of respective Random Access preambles. Additionally or alternatively, the mapping may indicate respective associations between respective CAPCs of the plurality of CAPCs and one or more types of control plane (CP) messages. The mapping may specify different default CAPCs for different types of transmission payload, if desired. The mapping may be implemented using any suitable format, such as one or more tables, sets of rules, decision trees, databases, and the like.

The method further includes performing, by the processing hardware of the device, a Listen-Before-Talk (LBT) procedure in accordance with the selected CAPC corresponding to the intended transmission. Upon a successful completion of the LBT procedure, the method includes delivering the intended transmission via the wireless channel.

Another example embodiment of the described techniques is a non-transitory medium storing instructions to perform at least a portion of embodiments of the disclosed method. Yet another example embodiment of the described techniques is a User Equipment configured to perform at least a portion of embodiments of the disclosed method. In an example, the UE includes a LBT enhancing unit that is stored on a non-volatile, non-transitory medium on-board the UE and that performs at least a portion of embodiments of the disclosed method. Still another example embodiment of the described techniques is a base station configured to perform at least a portion of embodiments of the disclosed method. For instance, a base station accesses a LBT enhancing unit that is stored on a non-volatile, non-transitory medium which is included in or otherwise accessible to the base station, and which performs at least a portion of embodiments of the disclosed method.

DETAILED DESCRIPTION

Figure 1:
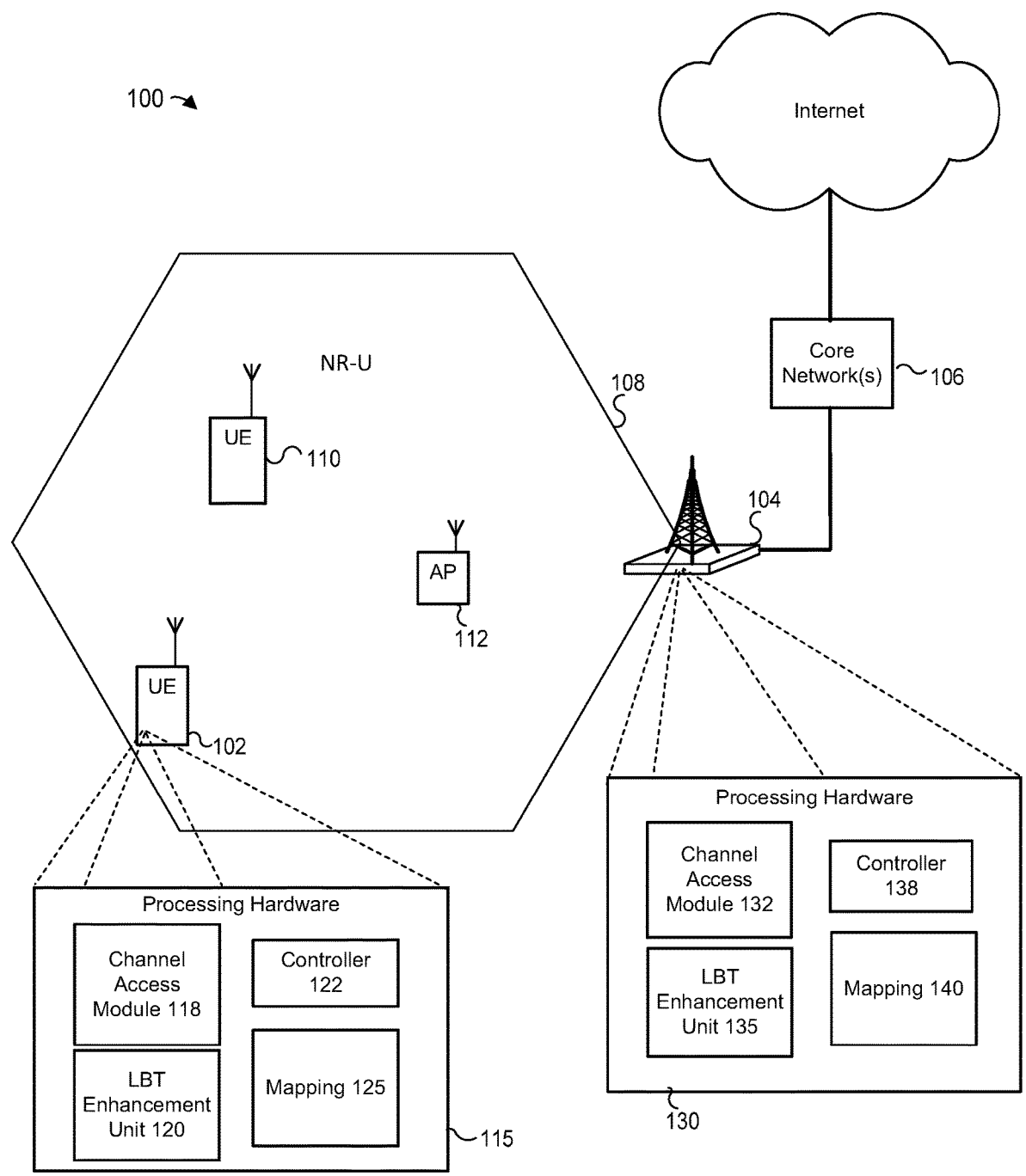
FIG. 1 depicts an example wireless communication network in which devices such as base stations and user equipment (UEs) communicate using unlicensed portions of radio spectrum upon successfully completing enhanced LBT procedures.

FIG. 1 depicts an example wireless communication network system 100 in which devices such as base stations and user devices (also referred within this disclosure as user equipment, or UEs) communicate using unlicensed portions of the radio spectrum. Because the examples below refer primarily (but not exclusively) to 5G NR technologies, these unlicensed portions of the radio spectrum are referred to as NR-U.

The wireless communication network system 100 in an example configuration includes a UE 102, which can be any suitable device capable of wireless communications (as further discussed below). As shown in FIG. 1, the wireless communication system 100 further includes a 5G NR base station 104 connected to a core network (CN) 106 of CN type SGC. The 5G NR base station 104 accordingly operates as a next generation or g NodeB (gNB). In other implementations, however, the wireless communication system 100 can include one or more base stations that operate according to radio access technologies (RATs) of types other than NR, and these base stations can be connected to CNs of other CN types, or operated in a standalone mode without a connection to any CN.

The base station 104 covers a 5G NR cell 108 in which UEs can utilize the NR-U as well as portions of the radio spectrum allocated specifically to the service provider that operates the base station 104 and the core network 106. When receiving data from, and transmitting data to, the base station 104 using the 5G NR air interface, the UE 102 may share the NR-U with other devices. For example, a UE 110 can be a subscriber of the service provider that operates the base station 104 and the core network 106, and thus can communicate with the base station 104. In another scenario, the UE 110 is a subscriber of another service provider that supports the NR-U and communicates with a base station other than the base station 104 (not shown to avoid clutter). In this scenario, a user operates the base station 104 and connects the base station 104 to a data network of an Internet service provider (ISP). The base station 104 in this case operates similar to a WiFi access point (AP) but utilizes the NR-U instead of one of the IEEE 802.11 standards to communicate with the UEs. Further, an AP (Access Point) 112 can utilize portions of the radio spectrum as the NR-U when operating in a wireless local area network (WLAN) according to one of IEEE 802.11 standards.

The UE 102 is equipped with processing hardware 115 that can include one or more general-purpose processors (e.g., CPUs) and one or more non-transitory computer-readable memories storing instructions that the one or more general-purpose processors execute. Additionally or alternatively, the processing hardware 130 can include special-purpose processing units. The processing hardware 115 in an example implementation includes a channel access module or unit 118 and an LBT enhancement unit 120 (each of which may be implemented at least partially by a respective set of instructions stored on the one or more non-transitory computer-readable memories), a controller 122, and a mapping 125 or other definition of associations of different types of transmission payloads to different CAPCs. In other implementations, the processing hardware 130 includes only some of the units 118-125.

Processing hardware 130 of the base station 104 also can include one or more general-purpose processors such as CPUs and one or more non-transitory computer-readable memories storing instructions that the one or more general-purpose processors execute. Additionally or alternatively, the processing hardware 130 can include special-purpose processing units. The processing hardware 130 in an example implementation includes a channel access module or unit 132 and an LBT enhancement unit 135 (each of which may be implemented at least partially by a respective set of instructions stored on the one or more non-transitory computer-readable memories), a controller 138, and a mapping 140 or other definition of associations of different types of transmission payloads to different CAPCs. In other implementations, the processing hardware 130 includes only some of the units 132-140.

Figure 2:
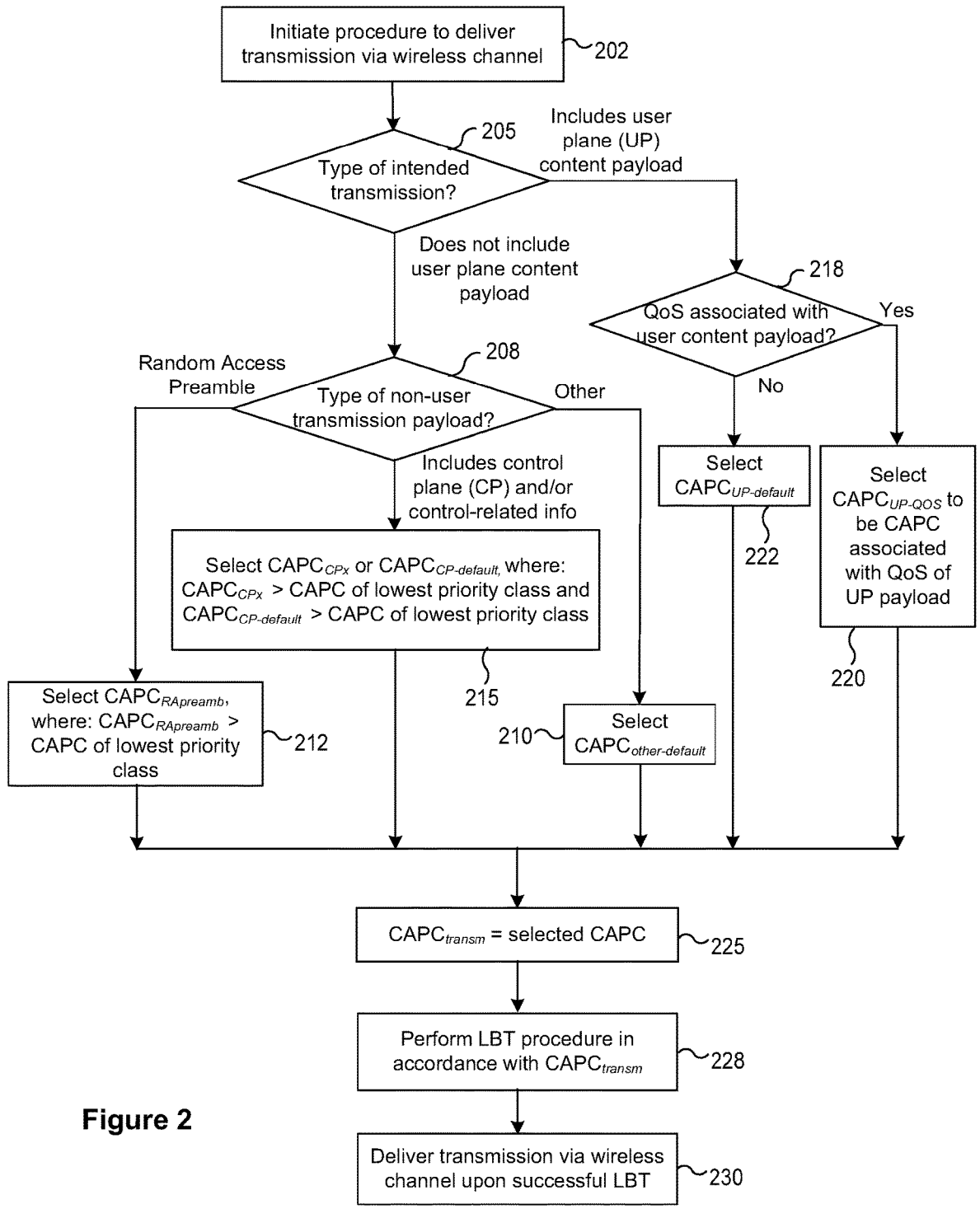
FIG. 2 is a flow diagram of an example method of performing an enhanced Listen-Before-Talk procedure.

FIG. 2 is flow chart of an example method 200 of performing an enhanced Listen-Before-Talk (LBT) procedure. The enhanced LBT procedure may be, for example, an omni-directional LBT procedure, or a directional LBT procedure. At least a portion of the method 200 may be performed by one or more components of the wireless communication network system 100 of FIG. 1. For example, at least a portion of the method 200 may be performed by the UE 102, by the UE 110, by the AP 112, or by the base station 104. At the UE 102, the LBT enhancement unit 120 of the UE 102 performs each instance of the method 200, in an embodiment. At the base station 104, the LBT enhancement unit 135 performs each instance of the method 200, in an embodiment. Additionally or alternatively, at least a portion of the method 200 may be performed by one or more other components of the wireless system 100. However, for ease of illustration, and not limitation purposes, the method 200 is discussed with simultaneous reference to FIG. 1. Moreover, in embodiments, the method 200 may include additional, less, or alternate functionality than that discussed with respect to FIG. 2, including that discussed elsewhere in this document.

As illustrated in FIG. 2, at block 202, the method 200 includes initiating, by processing hardware of a device, a procedure to deliver a transmission via a wireless carrier or channel of unlicensed spectrum. In an example scenario, the UE 102 initiates a procedure to deliver a wireless transmission (block 202) to the base station 104 based on a user instruction entered at UE, such as a call initiation, a data access or data delivery instruction, etc. In another example scenario, the base station 104 initiates a procedure to deliver a wireless transmission (block 202) to the UE 102 in response to a transmission received from the UE 102, based on user-plane (UP) content payload that is received from the core network 106, or to deliver a control-plane (CP) message or control-related information. The CP message or control-related information may be received from the core network 106, or may be generated by the base station 104.

At a block 205, the method 200 includes determining, by the processing hardware of the device, a type of the payload of the intended transmission. The type of payload of the intended transmission is interchangeably referred to within this document as the "payload of the transmission" or "transmission payload," examples of which include a Control Plane (CP) message, control-related information, a User Plane (UP) message including user content payload, a protocol data unit (PDU), a Random Access preamble or other radio access-related transmissions, or another type of transmission. A CP message may include, in an example, a common control channel (CCCH) message of or related to radio communications, such as an RRC (Radio Resource Control) request (e.g., a RRC Set Up request, a RRC Resume request, a RRC Reestablishment request, a RR Early Data request, etc.), a RAR (Radio Access Response), etc. A CP message may include, in an example, a Non-Access Stratum (NAS) or other type of control message of or related to the core network 106, such as for access and/or mobility management purposes.

A UP message may include, for example, an Internet Protocol (IP) packet, or another suitable type of data packet in which user content payload is included.

A protocol data unit (PDU) is another example of a type of intended transmission which the processing hardware of the device may determine (block 205). A PDU can be, for instance, a radio link control (RLC) protocol data unit, a packet data convergence protocol (PDC P) PDU, a service data adaptation protocol (SDAP) PDU, etc. In some scenarios, the PDU includes a CP message or other control-related information (e.g., which may correspond to radio resource control, or which may correspond to core network control, such as for access and/or mobility management purposes). In some scenarios, the PDU includes a UP message or user content payload.

Other types of intended transmissions which the processing hardware of the device may determine (block 205) include transmissions that are utilized in a four-step Random Access Channel (RACH) procedure. In an example scenario, a UE 102 initiates a respective instance of the method 200 to deliver a wireless transmission (block 202) as part of a four-step RACH procedure. For example, as part of the four-step RACH procedure, the UE 102 may intend to transmit a msg1 that includes a Random Access preamble, or the UE 102 may intend to transmit a msg3 that includes user content payload, and the UE may execute a respective instance of the method 200 with respect to the intended msg1 transmission and/or the intended msg3 transmission. On the base station side of a four-step RACH procedure initiated by the UE 102, the base station 104 may, in response to a received msg1, execute a respective instance of the method 200 with respect to an intended msg2 transmission, which may include a Random Access Response (RAR) or equivalent. The RAR may include various information such as, for example a Timing Advance (TA) Command, an Uplink (UL) grant (e.g., for the UE 102 to communicate with the base station 104 via a physical Uplink Shared Control Channel (PUSCH)), a temporary Cell Radio Network Identifier (C-RNTI), etc. Additionally or alternatively, as part of the four-step RACH procedure, the base station 104 may execute a respective instance of the method 200 with respect to an intended msg4 transmission in response to a received msg3.

Still other types of intended transmissions which the processing hardware of the device may determine (block 205) include transmissions that are utilized in a two-step Random Access Channel (RACH) procedure. In an example scenario, the UE 102 initiates a respective instance of the method 200 to deliver a wireless transmission (block 202) as part of a two-step RACH procedure. The intended transmission may include a msgA and, as such, may include both radio access preamble information as well as user content payload. On the base station side of a two-step Random Access Channel procedure initiated by the UE 102, the base station 104 may initiate a respective instance of the method 200 to deliver a wireless transmission (block 202) that is a msgB, for example. The msgB may include, for example, information such as a Radio Access Response (RAR) message, a Non-Access Stratum (NAS) or other type of control message of or related to the core network 106, a Cell Radio Network Identifier (C-RNTI), a Timing Advance (TA) Command, a Contention Resolution Identity (ID), a Downlink (DL) grant, a MAC SDU, etc.

In another example scenario, the base station 104 independently initiates a respective instance of the method 200 to deliver a wireless transmission (block 202) to the UE 102. That is, the intended wireless transmission is not a response to any transmission that was previously received at the base station 104 from the UE 102. For example, the base station 104 may receive control information and/or content payload from the core network 106 that is to be delivered to the UE 102, or the base station 104 itself may autonomously generate control information that is to be delivered to the UE 102. In this example scenario, the base station 104 may intend to transmit, via a physical downlink control channel (PDCCH) and/or via a physical downlink shared control channel (PDSCH), downlink control information (DCI) to configure an uplink grant for the UE 102 to communicate with the base station 104 on a physical uplink shared control channel (PUSCH), and accordingly may execute an instance of the block 202 of the method 200. Subsequently, the UE 102 executes a respective instance of block 202, as the UE 102 intends to transmit user plane data on the PUSCH in accordance with the uplink grant received from the base station 104. Generally speaking, the base station 104 may execute a respective instance of the method 200 of performing an enhanced LBT when intending to send any type of transmission to the UE 102 via unlicensed spectrum. When intending to send transmissions to the UE 102 via licensed spectrum, though, the base station 104 may omit performing the method 200, or may omit performing any type of LBT.

Similarly, the UE 102 may execute a respective instance of the method 200 of performing an enhanced LBT when intending to send any type of transmission to the base station 104 via unlicensed spectrum. When intending to send transmissions to the base station 104 via licensed spectrum, though, the UE 102 may omit performing the method 200, or may omit performing any type of LBT. Indeed, a set of transmissions that are delivered between the UE 102 and the base station 104 for various procedures (e.g., for a four-step RACH, for a two-step RACH, or other procedures) may utilize only the unlicensed spectrum, only the licensed spectrum, or a combination of both unlicensed and licensed spectrum.

Thus, generally speaking, determining, by the processing hardware of the device, a type of the intended transmission (block 205) may include determining a particular type of message included in the intended transmission, e.g., a CP message, a PDU message, a msg1, a msg2, a msg3, a msg4, a msgA, a msgB, etc. Additionally or alternatively, determining the type of the intended transmission (block 205) may include determining one or more types of transmission payload included in the intended transmission, e.g., a Random Access preamble, radio resource control information, core network-based control information (such as access and mobility management control information), user content payload, etc.

Returning now to the method 200, when the type of transmission is determined to exclude user plane content payload (as denoted by the bottom leg of block 205), the method 200 includes determining the type of non-user payload of the intended transmission (block 208), and selecting, by the processing hardware of the device and based on the determined type of non-user payload of the intended transmission, a channel access priority class (CAPC) from a plurality of CAPCs of different channel access priorities to be the CAPC corresponding to the intended transmission (e.g., as denoted by block 210, 212, or 215). For ease of discussion, this document refers to the CAPC corresponding to the intended transmission using the notation "$CAPC_{transm}$". As such, each of blocks 210, 212, 215 includes respectively selecting a particular CAPC from the plurality of CAPCs so that $CAPC_{transm}$=the selected CAPC, as is explained in more detail below.

When the payload of the intended transmission is indeterminate, unrecognized, or otherwise not associated a priori with any CAPC (e.g., the right leg of block 208), the method 200 includes selecting a default CAPC for the intended transmission (block 210), e.g., selecting $CAPC_{other-default}$ so that $CAPC_{transm}=CAPC_{other-default}$. The default CAPC may have a priority that is higher than the priority of the lowest priority CAPC (e.g., $CAPC_{other-default}$>lowest priority CAPC), or the default CAPC may have the lowest priority among the plurality of CAPCs (e.g., $CAPC_{other-default}$=lowest priority CAPC).

When the payload of the intended transmission is determined to include one of certain types of transmission payload (e.g., the left and bottom legs of block 208 respectively corresponding to blocks 212 and 215), generally the selected CAPC has a channel access priority higher than a channel access priority of another CAPC included in the plurality of CAPCs. That is, at block 212 or block 215, the selected CAPC is not the lowest priority CAPC of the plurality of CAPCs, e.g., $CAPC_{transm}$>lowest priority CAPC.

In embodiments, at blocks 210, 212, 215, the selecting of the CAPC corresponding to the intended transmission may be based on both the determined type of non-user transmission payload and a mapping 125 or 140. The mapping 125, 140 indicates or defines respective associations between different types of transmission payloads and respective CAPCs of different priorities. In an embodiment, the mapping 125, 140 indicates at least one of (i) respective associations between respective CAPCs of the plurality of CAPCs and one or more types of respective Random Access preambles, or (ii) respective associations between respective CAPCs of the plurality of CAPCs and one or more types of control plane (CP) messages or control plane information.

For example, with respect to Random Access preambles, the mapping 125, 140 may indicate that only one (e.g., a same) CAPC is associated with any type of Random Access preamble, or the mapping 125, 140 may indicate that different CAPCs are associated with respective different types of Random Access preambles. Typically, but not necessarily, each CAPC associated with a respective Random Access preamble has a respective priority greater than the priority of the lowest priority CAPC. That is, each CAPC associated with a respective Random Access preamble is not a lowest priority CAPC among the plurality of CAPCs. As such, when the type of payload of the intended transmission is determined to be a Random Access preamble (e.g., the left leg of block 208), selecting the CAPC of the intended transmission including RApreamble payload (block 212) results in selecting a CAPC that is not the lowest priority CAPC, e.g., so that $CAPC_{transm}=CAPC_{RApreamb}$, where $CAPC_{RApreamb}$>lowest priority CAPC.

In another example, with respect to transmission payloads that include CP messages and/or control-related information (such as, for example, radio resource control-related information or core network control-related information), the mapping 125, 140 indicates that only one CAPC, e.g., $CAPC_{CP-default}$, is associated with any type of control-related transmission payload, where the respective priority of $CAPC_{CP-default}$ is not a lowest priority among the plurality of CAPCs, e.g., $CAPC_{CP-default}$>lowest priority CAPC. As such, in this example, selecting the CAPC of the intended transmission having control-related information (block 215) results in selecting a CAPC that is not the lowest priority CAPC, e.g., so that $CAPC_{transm}=CAPC_{CP-default}$, where $CAPC_{CP-default}$>lowest priority CAPC. A default CAPC for control-related transmission payload may be specified a priori, such as in one of the 3GPP standards or in another type of standards specification.

Alternatively with respect to transmission payloads that include CP messages and/or control information, the mapping 125, 140 may indicate that different CAPCs are associated with respective different types of control-related transmission payload, e.g., $CAPC_{CPx}$. For example, radio resource control messages may be associated with a first CAPC, while core network control messages may be associated with a second CAPC. Additionally or alternatively, different radio resource control messages may be associated with different CAPCs. At any rate, each CAPC that is associated with a respective type of control-related transmission payload typically has a respective priority greater than the priority of a lowest priority CAPC, e.g., $CAPC_{CPx}$>lowest priority CAPC. Accordingly, in this example scenario, selecting the CAPC of the intended transmission having control-related information (block 215) results in selecting a CAPC that is not the lowest priority CAPC, e.g., so that $CAPC_{transm}=CAPC_{CPx}$, where $CAPC_{CPx}$>lowest priority CAPC.

Still alternatively with respect to transmission payloads that include CP messages and/or control information (such as, for example, radio resource control-related information or core network control-related information), in some scenarios, the UE 102 selects the $CAPC_{CP-default}$, where $CAPC_{CP-default}$>lowest priority CAPC. For instance, the UE 102 may select $CAPC_{CP-default}$ when the UE 102 executes the method 200. The UE 102 may or may not utilize the mapping 125 when selecting $CAPC_{CP-default}$.

At block 215, selected CAPCs corresponding to control-related transmission payload may be of higher priorities than the priorities of CAPCs of user content transmission payload. For example, a CAPC of any control-related transmission payload may have a priority that is greater than the priority of the CAPC of any user plane or content transmission payload, e.g., $CAPC_{CPx} > CAPC_{UP-QOS}$ AND $CAPC_{CPx} > CAPC_{UP-default}$, and/or $CAPC_{CP-default} > CAPC_{UP-QOS}$ AND $CAPC_{CP-default} > CAPC_{UP-default}$. As such, control-related transmission payloads may be given priority over user content transmission payloads within the system 100, at least for delivery purposes between the UE 105 and the base station 104. Generally speaking, CAPCs of control-related transmission payload are also typically of higher priorities than a general default CAPC of the system 100, e.g., $CAPC_{CPx} > CAPC_{other-default}$ and $CAPC_{CP-default} > CAPC_{other-default}$.

Returning to block 205, when the type of intended transmission includes user plane (UP) content payload, the method 200 determines if the user content payload included in the intended transmission is associated with any QoS level (block 218). For example, at block 218, the method 200 determines whether or not the type of user content payload included in the intended transmission is associated with or otherwise corresponds to a QoS level or a QCI. When a particular QoS or QCI is associated with type of user content payload (e.g., the "yes" leg of block 218), the method 200 includes selecting the CAPC of the intended transmission to be the CAPC corresponding to the QCI or QoS level associated with the type of user content payload (block 220). For instance, the method 200 may utilize the information specified in aforementioned Table 5.7.1-1 of 3GPP TS 36.300 v15.4.0 to determine the CAPC corresponding to the QCI associated with the determined type of user content payload.

When the type of user content payload is not associated with any QoS level or with any QCI (e.g., the "no" leg of block 218), the method 200 defaults to assigning a default CAPC to the intended transmission having UP content payload, e.g., $CAPC_{UP-default}$ (block 222). The default CAPC may have a priority higher than the priority of a CAPC of the lowest priority class (e.g., $CAPC_{UP-default} > CAPC$ of lowest priority class), or the default CAPC may have the lowest priority among the plurality of CAPCs (e.g., $CAPC_{UP-default} = CAPC$ of lowest priority class). A default CAPC for user plane content payload may be specified a priori, such as in a 3GPP or other type of standards specification. Additionally or alternatively, the UE 102 may select $CAPC_{UP-default}$, e.g., when the UE 102 executes the method 200.

At blocks 215, 220, in embodiments, the method 200 may include selecting differently-prioritized default CAPCs for different types of transmission payload, if desired. For example, a default CAPC for an intended transmission that includes user content payload that is unassociated with any QoS or QCI (and that excludes any control-related information) may have a higher priority than a priority of a default CAPC for an intended transmission that includes indeterminate or unrecognized payload, e.g., $CAPC_{UP-default} > CAPC_{other-default}$. In another example, a default CAPC for an intended transmission that includes control-related information may have a higher priority than a priority of a default CAPC for an intended transmission that includes indeterminate or unrecognized payload, and may have a higher priority than a priority of a default CAPC for intended transmissions that include user plane content data, e.g., $CAPC_{CP-default} > CAPC_{other-default}$ and $CAPC_{CP-default} > CAPC_{UP-default}$. One or more types of default CAPCs may be specified a priori, such as in a 3GPP or other type of standards specification. Additionally or alternatively, the UE 102 may select one or more types of default CAPCs, e.g., when the UE 102 executes the method 200.

For a single, intended transmission in which multiple types of transmission payload are included, typically one of multiple types of transmission payload governs the selection of the CAPC (not shown in FIG. 2). For example, for a first intended msgA transmission that includes both user plane content payload having an associated QCI and an RApreamble as its transmission payload, the QCI of the user plane content payload may govern the selection of the CAPC of the first intended msgA transmission. In another example, for a second intended msgA transmission that includes both user plane content payload that does not have any associated QCI and an RApreamble as its transmission payload, the RApreamble type may govern the selection of the CAPC of the second intended msgA transmission. In still another example, when an intended transmission includes both user plane data payload having an associated QCI and control plane information, the QCI of the user plane content payload may govern the CAPCselection; whereas when an intended transmission includes both user plane data payload that is not associated with any QCI and control plane information, the control plane information may govern the selection of the CAPC. In an embodiment, the mapping 125, 140 may indicate priorities of governance for intended transmissions that include multiple different types of transmission payload.

At block 225, the method 200 includes determining the CAPC associated with the intended transmission to be the selected CAPC. For example, the method 200 may include determining the CAPC associated with the intended transmission to be the CAPCselected at block 210, 212, 215, 220, or 220, e.g., so that $CAPC_{transm}$=the selected CAPC.

At block 228, the method 200 includes performing, by the processing hardware of the device, a Listen-Before-Talk (LBT) procedure in accordance with $CAPC_{transm}$, e.g., in accordance with the selected CAPC corresponding to the intended transmission. That is, at block 228, the method 200 includes performing an enhanced LBT procedure based on $CAPC_{transm}$. For example, at the UE 102, the channel access unit 118 and/or the controller 120 may perform the enhanced LBT procedure in accordance with the selected CAPC corresponding to the transmission, and at the at the base station 104, the channel access unit 132 and/or the controller 138 may perform the enhanced LBT procedure in accordance with the selected CAPC corresponding to the transmission.

Upon a successful completion of the enhanced LBT procedure, the method 200 includes delivering the intended transmission via the wireless carrier or channel within unlicensed spectrum (block 230) to another device. For example, if the method 200 is performed by the UE 102, at block 230 the UE 102 delivers the transmission to the base station 104 via the wireless carrier or channel, and if the method 200 is performed by the base station 104, at block 230 the base station 104 delivers the transmission to the UE 102 via the wireless carrier or channel.

Figure 3:
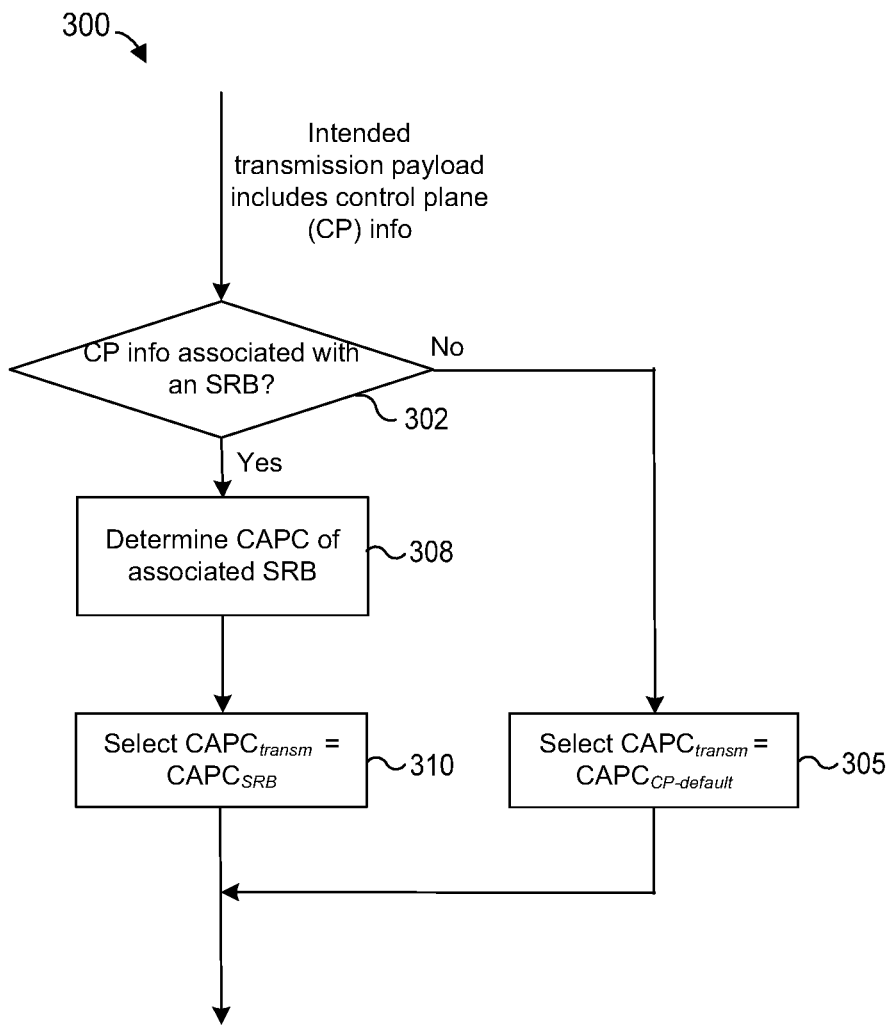
FIG. 3 is a flow diagram of an example method of selecting a channel access priority class for an intended transmission that includes control plane information.

FIG. 3 is a flow diagram of a method 300 of selecting a CAPC for an intended transmission, e.g., selecting $CAPC_{transm}$, where the intended transmission includes control-related or control plane (CP) information. In an embodiment, the method 300 may be included in block 215 of the method 200 of FIG. 2. However, the method 300 may be performed in conjunction with methods of performing an enhanced LBT other than the method 200, if desired.

When payload of an intended transmission includes control plane (CP) information (for example, as determined at block 208 of FIG. 2), the method 300 includes determining whether or not the CP information is associated with a signal radio bearer (SRB) (block 302). Generally speaking, an SRB is a radio bearer between a UE (e.g., the UE 102) and a base station (e.g., the base station 104) that is used to carry control plane messages or traffic between the UE and the base station. As such, SRBs may be logical channels or logical connections via which signaling data is delivered between the UE 102 and the base station 104. The UE 102 may support multiple SRBs, and different types of CP information or messages may be assigned to be delivered between UEs and base stations via different respective SRBs. For example, the multiple SRBs may include three different types, e.g., SRB0, SRB1, and SRB2. In some cases, the multiple SRBs may include the types SRB3 and/or SRB4 in addition to SRB0, SRB1, and SRB2.

At block 302, when the CP information included in the intended transmission is not associated with any SRB (e.g., the "no" leg of block 302), the method 300 includes selecting a default CAPC for the intended transmission (block 305). The default CAPC may be a default CAPC corresponding to CP messages/information, e.g., so that $CAPC_{transm}=CAPC_{CP\text{-}default}$, or the default CAPC may be a general default CAPC, such as used for indeterminate or unrecognized transmission payloads, e.g., so that $CAPC_{transm}=CAPC_{other\text{-}default}$. As previously discussed, typically (but not necessarily) $CAPC_{CP\text{-}default}$ has a priority that is greater than a priority of the lowest priority CAPC of the plurality of CAPCs, and in some situations, the priority of $CAPC_{CP\text{-}default}$ is higher than respective priorities of any CAPC associated with user plane content payload, e.g., $CAPC_{CP\text{-}default} > CAPC_{UP\text{-}default}$ and $CAPC_{CP\text{-}default} > CAPC_{UP\text{-}QoS}$, such as when the intended transmission is included in a four-step RACH procedure.

On the other hand, when the CP information included in the intended transmission is associated with an SRB (e.g., the "yes" leg of block 302), the method 300 includes determining the CAPC corresponding to the SRB associated with the CP information included in the intended transmission (block 308). In some implementations, determining the CAPC corresponding to the SRB (block 308) includes accessing the mapping 125, 140, where the mapping 125, 140 stores associations between various SRBs and respective CAPCs. Typically, but not necessarily, each CAPC that is associated with a respective SRB has a respective priority than the priority of the lowest priority CAPC of the plurality of CAPCs. That is, each CAPC that is associated with a respective SRB is not the lowest priority CAPC of the plurality of CAPCs. At block 310, the method 300 includes selecting the CAPC of the SRB to be the CAPC of the intended transmission, e.g., so that $CAPC_{transm}=CAPC_{SRB}$.

Although the method 300 is described with respect to different SRBs, the concepts and techniques are easily and equally applicable to logical channels implemented on CCCHs (Common Control Channels) and/or DCCHs (Dedicated Control Channels). For example, different logical channels having different logical channel identities may be implemented on different CCCHs and/or DCCHs, and may be respectively associated with different CAPCs, e.g., as defined in the mapping 125, 140.

Figure 4:
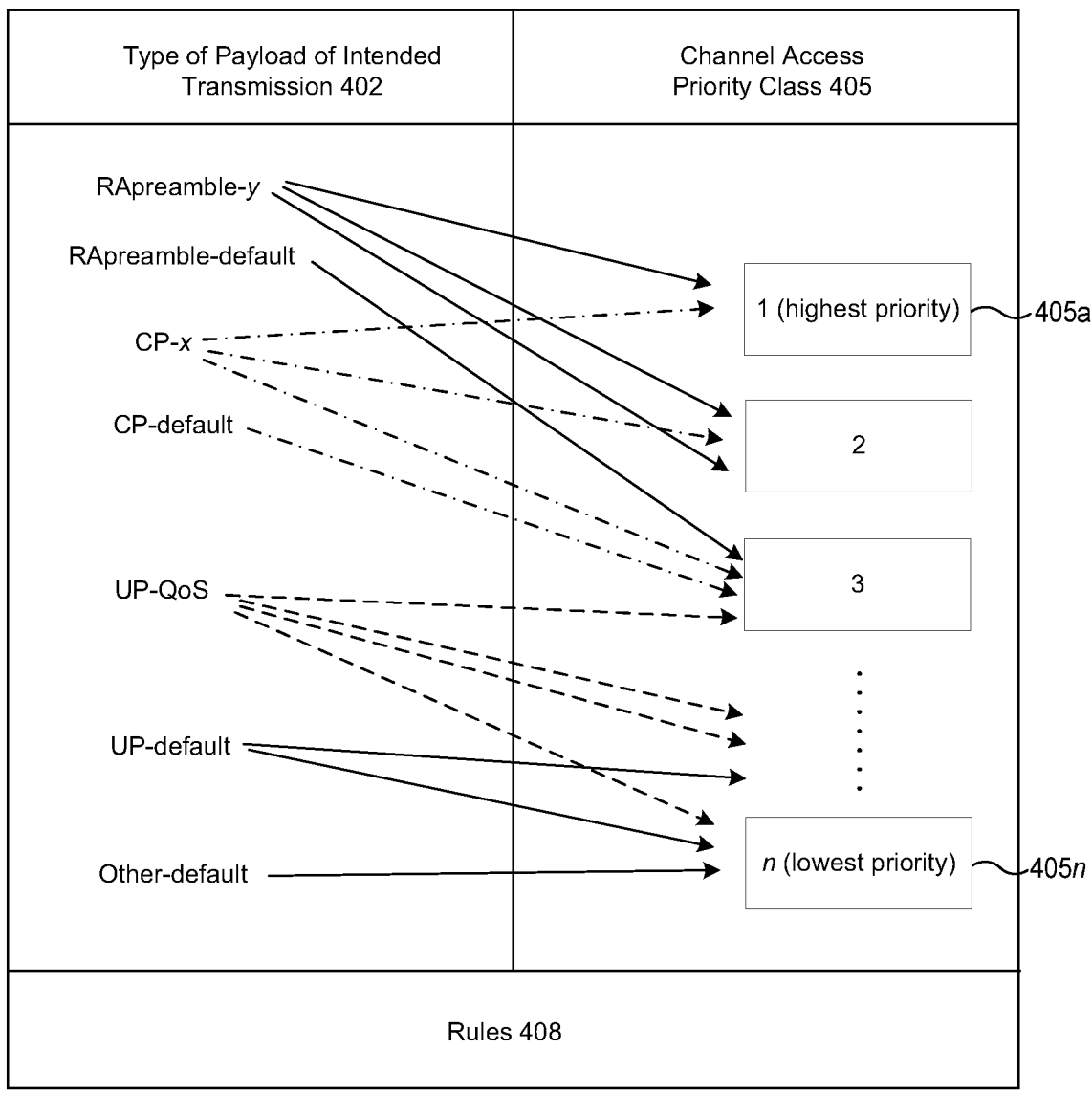
FIG. 4 is an example implementation of a mapping which may be utilized in an enhanced Listen-Before-Talk procedure.

FIG. 4 depicts a depiction of an example mapping 400 which may be utilized in an enhanced Listen-Before-Talk procedure. The mapping 400 may be the mapping 125 that is accessed by the UE 102 for enhanced LBT purposes, and/or the mapping 400 may be the mapping 140 that is accessed by the base station 104 for enhanced LBT purposes. The representation of the mapping 400 shown in FIG. 4 is only one of many possible representations or implementations. For example, the mapping 400 may be represented by using one or more tables, sets of rules, weightings, logic statements, databases, and/or any other suitable representation formats.

As illustrated in FIG. 4, the mapping 400 indicates or defines respective associations between different types of payload which may be included in an intended transmission 402 to respective Channel Access Priority Classes (CAPCs) 405. CAPCs may range in priority from a highest priority 405a to a lowest priority 405n, and each CAPC may be uniquely identified, such as via a corresponding numeral as shown in FIG. 4. Generally speaking, each type of transmission payload may be associated with a respective default CAPC. For example, in FIG. 4, RApreamble-default is associated with CAPC3, CP-default is associated with CAPC3, UP-default is associated with CAPCn or with a CAPC of a higher priority than CAPCn, and Other-default is associated with CAPCn. Of course, these and other contents of the mapping 400 are illustrative only, and not meant to be limiting. Other mappings between types of transmission payloads 402 and CAPCs 405 are possible. Some of the content included in the mapping 400 may be defined or provided by specification standards, such as one of the versions of the 3GPP standard or another standard. Some of the content included in the mapping 400 may be defined or provided by a user, such as a system administrator of the system 100.

For a given type of transmission payload, different sub-types of the transmission payload type may be associated with respective different CAPCs. For example, in FIG. 4, different types of RApreambles (e.g., as denoted by RApreamble-y), are mapped to different CAPCs 1 and 2; different types of control plane (CP) messages (e.g., as denoted by CP-x) are mapped to different CAPCs 1, 2, and 3; and different user plane (UP) content payload (e.g., as denoted by UP-QoS) are mapped to different CAPCs 3, n, and CAPCs with priorities greater than CAPCn and less than CAPC3 based on the respective QCIs or QoS levels associated with the sub-types of UP content payload.

Further, the mapping 400 defines or indicates a general default CAPC for types of transmission payloads that are indeterminate, unrecognized, or otherwise not indicated elsewhere in the mapping 400. In FIG. 4, the general, default CAPC of the system 100 is associated with the lowest priority CAPC, e.g., CAPCn.

Although not illustrated in FIG. 4, in some embodiments, the mapping 400 may store indications of associations between various SRBs and respective CAPCs and/or logical channels and respective CAPCs in a similar manner. Such embodiments of the mapping 400 may be utilized by the method 300, for example.

In addition to defining or indicating associations between specific types and/or sub-types of transmission payload 402 to respective CAPCs 405, the mapping 400 may specify one or more rules 408 that are applied to various combinations of conditions corresponding to the types of transmission payload 402. The rules 408 may be represented by any suitable format, such as by a set of weightings or priorities that are applied to or associated with each possible condition and/or combinations of conditions. Additionally or alternatively, the rules 408 may be represented by a set of logic statements, by a set of objects, by one or more databases, etc.

At least some of the rules 408 may indicate which one of multiple types of transmission payload that are included in a single, intended transmission is to govern the selection of a corresponding CAPC of the intended transmission. For example, for an intended transmission that includes both (i) user plane content payload that does not have any associated QCI and (ii) an RApreamble, the rules 408 may indicate that the RApreamble type is to govern the selection of the CAPC of the intended transmission, while for an intended transmission that includes both (i) user plane content payload that has an associated QCI and (ii) an RApreamble, the rules 408 may indicate that the QCI associated with the user plane content payload is to govern the selection of the CAPC of the intended transmission.

At least some of the rules 408 may define or indicate relative priorities among different types of transmission payloads 402. For example, the rules may indicate that the default CAPC of control-related transmissions is always of higher priority than the default CAPC of user content payload transmissions (e.g., $CAPC_{CP\text{-}default} > CAPC_{UP\text{-}default}$), or that the default CAPC of control-related transmissions is always of higher priority than the CAPC of any user content payload transmission (e.g., $CAPC_{CP\text{-}default} > CAPC_{UP\text{-}default}$ AND $CAPC_{CP\text{-}default} > CAPC_{UP\text{-}Qos}$). In another example, the rules 408 may indicate that the default CAPC of a particular type of transmission is less than or equal to CAPCs of sub-types of the particular type of transmission, e.g., $CAPC_{CP\text{-}default} <= CAPC_{CPx}$ and/or $CAPC\text{-}RA_{preamble\text{-}default} <= CAPC_{RApreamble\text{-}y}$. Of course, other relative priorities among different types of transmission payloads 402 may be defined or indicated by the rules 408.

At least some of the rules 408 may define or indicate different associations between types of transmission payloads 402 and CAPCs 405 based on message type and/or communication context. For example, the rules 408 may indicate that for a two-step RACH, when a msgA includes both an RApreamble and user plane content payload associated with a QCI, the QCI associated with the user plane content payload is to govern the selection of the msgA, and the rules 408 may indicate that for a four-step RACH, an intended transmission including an RApreamble has a higher priority than another transmission within the four-step RACH whose payload includes only CP information or only UP content payload.

At least some of the rules 408 may define or indicate limits on autonomous CAPC selection. For example, the rules 408 may define or indicate that a UE 102 may autonomously select any CPAC>CPACn for intended transmissions that include CP information, or that the UE 102 may autonomously define or select a default UP CAPC, e.g., $CAPC_{UP\text{-}default}$, to be any CAPC>CAPCn. This approach allows the UE 102 to have flexibility based upon its current view of channel usage, while still minimizing inappropriate, inconsistent, and unnecessary delays in delivering the intended transmission.

The following additional considerations apply to the foregoing discussion.

A user device or User Equipment (UE) in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional alternative structural and functional designs for enhancing Listen-Before-Talk procedures through the principles disclosed in this disclosure. Thus, while particular embodiments and applications have been illustrated and described, it is to be understood that the disclosed embodiments are not limited to the precise construction and components disclosed. Various modifications, changes and variations, which will be apparent to those of ordinary skill in the art, may be made in the disclosed arrangement, operation and details of the method, and apparatus without departing from the spirit and scope defined in the appended claims.

The following list of aspects reflects a variety of the embodiments explicitly contemplated by the present disclosure.

Aspect 1. A method in a device of a wireless network system comprises: initiating, by processing hardware of the device, a procedure to deliver a transmission via a wireless channel; selecting, by the processing hardware of the device, a channel access priority class (CAPC) from a plurality of CAPCs of different channel access priorities, the selected CAPC having a channel access priority higher than a channel access priority of another CAPC included in the plurality of CAPCs, the selecting based on a payload of the transmission and a mapping, and the mapping indicating at least one of: respective associations between respective CAPCs of the plurality of CAPCs and one or more types of respective Random Access preambles; or respective associations between respective CAPCs of the plurality of CAPCs and one or more types of control plane (CP) messages. The method further comprises performing, by the processing hardware of the device, a Listen-Before-Talk (LBT) procedure in accordance with the selected CAPC corresponding to the transmission.

Aspect 2. The method of aspect 1, wherein the mapping further indicates an association between (i) data content of User Plane (UP) messages, the data content of UP messages being unassociated with any Quality of Service (QoS) class of the wireless network system, and (ii) a CAPC having a lowest channel access priority.

Aspect 3. The method of aspect 2, wherein the payload of the transmission includes a UP message having the data content that is unassociated with any QoS class, and performing the LBT procedure in accordance with the selected CAPC corresponding to the transmission includes performing an LBT procedure in accordance with the CAPC having the lowest channel access priority.

Aspect 4. The method of any one of the preceding aspects, wherein the mapping further indicates respective associations between respective CAPCs of the plurality of CAPCs and different types of data content of UP messages, the different types of data content of UP messages having respective associations with different Quality of Service (QoS) classes of the wireless network system.

Aspect 5. The method of any one of aspects 1-2 and 4, wherein the payload of the transmission includes a UP message having data content that is associated with a particular QoS class, and performing the LBT procedure in accordance with the selected CAPC corresponding to the transmission includes performing an LBT procedure in accordance with a CAPC associated with the particular QoS class.

Aspect 6. The method of any one of aspects 1-2 and 4, wherein: the payload of the transmission includes a CP message; the mapping indicates an association between the selected CAPC and the CP message; and the selected CAPC has a channel access priority higher than a respective channel access priority of any CAPC associated with UP messages.

Aspect 7. The method of aspect 6, wherein: the CP message has an association with a type of signal radio bearer (SRB); the mapping indicates the association between the selected CAPC and the type of signal radio bearer associated with the CP message; and the selected CAPC is a particular CAPC that has an association with the type of signal radio bearer (SRB) and that has a channel access priority higher than a respective channel access priority of any CAPC associated with any CP message that is unassociated with any type of SRB.

Aspect 8. The method of aspect 7, wherein the respective channel access priority of the any CAPC associated with the any CP message that is unassociated with the any type of SRB is a default CAPC of CP messages, and wherein the default CAPC of CP messages has a higher channel access priority than a CAPC having a lowest channel access priority.

Aspect 9. The method of any one of aspects 6-8, wherein: the CP message has an association with a first type of signal radio bearer (SRB); the selected CAPC is a first CAPC associated with the first type of SRB and that has a channel access priority level higher than a channel access priority of a second CAPC associated with a second type of SRB; the mapping indicates the association between the first CAPC and the first type of SRB; and the mapping indicates the association between the second CAPC and the second type of SRB.

Aspect 10. The method of any one of aspects 1-9, wherein the device is a User Equipment (UE).

Aspect 11. The method of aspect 10, wherein the procedure is a four-step Random Access Channel procedure that includes the transmission.

Aspect 12. The method of aspect 11, wherein the transmission includes a type of Random Access preamble, and the wireless channel is a Physical Random Access Channel (PRACH).

Aspect 13. The method of aspect 12, wherein the mapping indicates respective associations between different CAPCs and different types of Random Access preambles.

Aspect 14. The method of aspect 11, wherein the transmission includes a UP message or a CP message, and the wireless channel is a Physical Uplink Shared Channel (PUSCH).

Aspect 15. The method of aspect 10, wherein the procedure is a two-step Random Access Channel procedure and the transmission is a msgA.

Aspect 16. The method of any one of aspects 1-9, wherein the device is a base station.

Aspect 17. The method of aspect 16, wherein the procedure is a four-step Random Access Channel procedure and the transmission includes a Random Access Response.

Aspect 18. The method of aspect 16, wherein the procedure is a two-step Random Access Channel procedure and the transmission is a msgB.

Aspect 19. The method of aspect 16, wherein the wireless channel is a Physical Downlink Shared Channel (PDSCH).

Aspect 20. The method of aspect 19, wherein the transmission includes a UP message or a CP message.

Aspect 21. The method of any one of aspects 16 and 19-20, further comprising receiving, by the processing hardware of the base station, the payload of the transmission from a core network.

Aspect 22. The method of any one of aspects 16-21, further comprising generating, by the processing hardware of the base station, the payload of the transmission.

Aspect 23. The method of any one of the preceding aspects, wherein the wireless channel is included in unlicensed spectrum.

Aspect 24. The method of any one of the preceding aspects, wherein the LBT procedure is an omni-directional LBT procedure.

Aspect 25. The method of any one of the preceding aspects, wherein the LBT procedure is a directional LBT procedure.

Aspect 26. One or more non-transitory media respectively storing thereon instructions that, when executed by the processing hardware, cause the wireless network system to perform a method according to any one of the preceding claims.

Aspect 27. A system configured to perform a method according to any one of aspects 1-25.

Aspect 28. Any one of the preceding claims in combination with any other one of the preceding aspect.

What is claimed is:

1. A method in a base station of a wireless network system, the method comprising:
   initiating, by the base station, a procedure to deliver a transmission to a User Equipment (UE) via a logical control channel of a wireless channel;
   selecting, by the base station, a channel access priority class (CAPC) from a plurality of CAPCs of different channel access priorities, the selected CAPC associated with the logical control channel of the wireless channel, and the logical control channel having a channel access priority higher than a channel access priority of another CAPC that is included in the plurality of CAPCs and that is not associated with any logical control channel of the wireless channel; and performing, by the base station, a Listen-Before-Talk (LBT) procedure in accordance with the selected CAPC corresponding to the transmission.

2. The method of claim 1, wherein selecting the CAPC associated with the logical control channel includes selecting the CAPC by utilizing a mapping indicating respective associations between different logical channels and respective CAPCs of the plurality of CAPCs.

3. The method of claim 2, wherein the logical control channel is implemented on one of different logical channels including a Common Control Channel (CCCH) and a Dedicated Control Channel (DCCH).

4. The method of claim 2, wherein the different logical channels correspond to different sets of types of Signaling Radio Bearers (SRBs).

5. The method of claim 2, wherein a payload of the transmission includes control information to be delivered via the logical control channel; and the mapping indicates an association between the selected CAPC and the control information.

6. The method of claim 5, wherein:
the payload of the transmission includes a control plane (CP) message; and
the mapping indicates an association between the selected CAPC and the CP message.

7. The method of claim 6, wherein:
the CP message has an association with a type of signal radio bearer (SRB); and
the mapping indicates the association between the selected CAPC and the type of SRB associated with the CP message.

8. The method of claim 5, wherein a default CAPC of the control information has a higher channel access priority than a CAPC having a lowest channel access priority.

9. The method of claim 6, wherein:
the CP message has an association with a first type of signal radio bearer (SRB);
the selected CAPC is a first CAPC associated with the first type of SRB and that has a channel access priority level higher than a channel access priority of a second CAPC associated with a second type of SRB;
the mapping indicates the association between the first CAPC and the first type of SRB; and
the mapping indicates the association between the second CAPC and the second type of SRB.

10. The method of claim 5, wherein the transmission includes a Radio Resource Control (RRC) message.

11. The method of claim 5, wherein the transmission includes a (Medium Access Control (MAC) signaling data unit (SDU).

12. A base station comprising processing hardware and configured to implement the method according to claim 1.

13. The method of claim 1, wherein the procedure is a first procedure, the transmission is a first transmission, the selected CAPC is a first selected CAPC, the LBT procedure is a first LBT procedure, and the method further comprises:
initiating, by the base station, a second procedure to deliver a second transmission via the wireless channel;
selecting, by the base station, a second CAPC from the plurality of CAPCs, the second CAPC having a channel access priority higher than a respective channel access priority of the at least one other CAPC included in the plurality of CAPCs; and
performing, by the base station, a second LBT procedure in accordance with the second CAPC.

* * * * *